Jan. 21, 1958 C. CATUCCIO 2,820,423
FOOD MOLDING DEVICES
Filed July 12, 1956 2 Sheets-Sheet 1
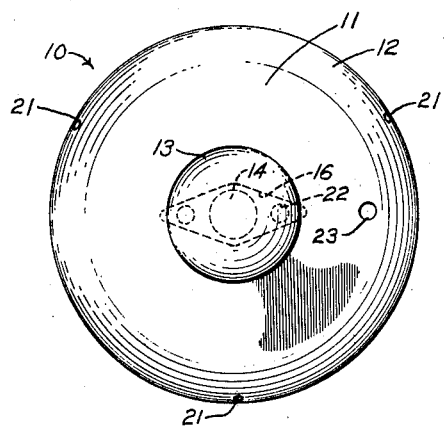
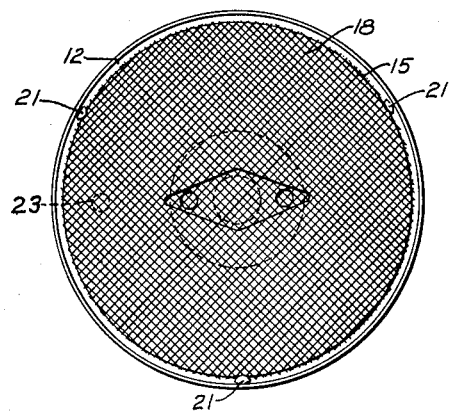
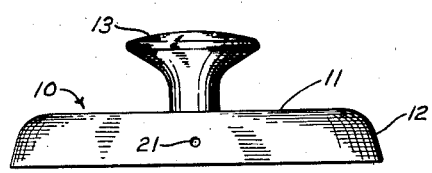
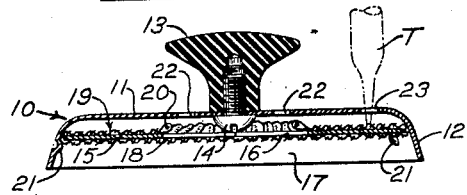
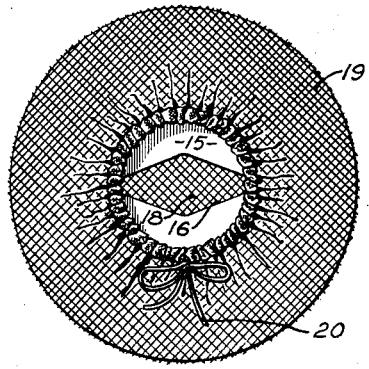
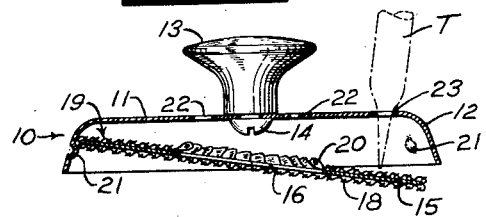
INVENTOR.
CARMINE CATUCCIO
BY
H. G. Manning
ATTORNEY Jan. 21, 1958 C. CATUCCIO 2,820,423
FOOD MOLDING DEVICES
Filed July 12, 1956 2 Sheets-Sheet 2

INVENTOR.
CARMINE CATUCCIO
BY
H. G. Manning
ATTORNEY

2,820,423

Patented Jan. 21, 1958

2,820,423
FOOD MOLDING DEVICES

Carmine Catuccio, Waterbury, Conn.

Application July 12, 1956, Serial No. 597,424

1 Claim. (Cl. 107—47)

This invention relates to food molding devices and more particularly to a press for shaping ground meat, hash, potatoes, ice cream, and other molded food products into flat cakes or patties.

One object of this invention is to provide a device of the above nature which includes a fabric lining to which the patty will not adhere so that it may be readily removed therefrom.

Another object is to provide a device of the above nature which includes a vented air chamber above the molding cavity, whereby no stripper will be required to eject the patty from the molding press.

Another object is to provide a device of the above nature which may easily be taken apart to facilitate cleaning and renewal of the fabric lining.

A further object is to provide a device of the above nature having a recessed base to permit patties or other food articles of substantial thickness to be molded.

A further object is to provide a device of the above nature which will be simple in construction, inexpensive to manufacture, easy to manipulate, compact, ornamental in appearance, and very efficient and durable in use.

With these and other objects in view, there has been illustrated on the accompanying drawing one form in which the invention may conveniently be embodied in practice.

In the drawings,

Fig. 1 is a top plan view of the food press.

Fig. 2 is a bottom view of the same.

Fig. 3 is a side elevation of the same.

Fig. 4 is a cross-sectional view of the same, showing in broken lines a tool for removing the inner plate from the press for cleaning or removing the fabric lining.

Fig. 5 is a view similar to Fig. 4, showing the inner plate as it would appear during the plate-removal operation.

Fig. 6 is a plan view of the inner plate and the fabric lining tied thereon.

Figure 7:
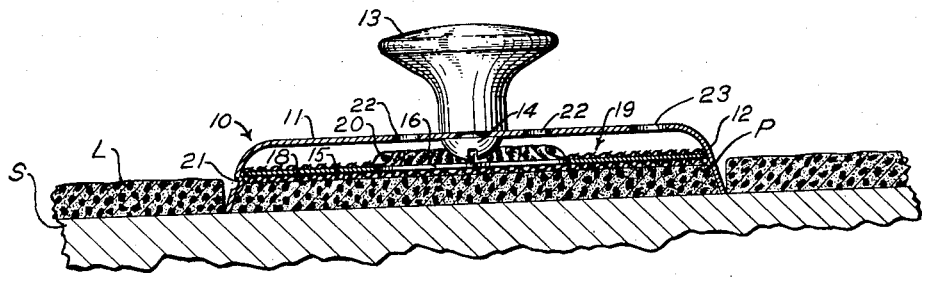
Fig. 7 is a cross-sectional view of the food press as it would appear during the operation of cutting a patty from a quantity of meat.

Referring now to the drawings in which like reference numerals denote corresponding parts throughout the several views, the numeral 10 indicates a body member in the form of an inverted shallow cup having a flat top wall 11 and a downwardly-flared peripheral wall 12.

The top of the body member 10 is provided with a tapped central handle 13 secured thereto by means of a screw 14 received in an aperture in the top wall 11. The body member 10 is also provided with an inner circular plate 15 which has an elongated diamond-shaped central aperture 16. The plate 15 is spaced from the top wall 11 and forms the inner wall of a molding chamber 17 in the lower portion of the body member 10.

The chamber 17 has a fabric lining 18 which covers the lower face of the inner plate 15, and extends upwardly over the edges and upper surface of said plate 15 in the form of a bag 19 and is secured by a drawstring 20 preferably of rubber. The word "fabric" as used herein is intended to designate cheesecloth, linen, and equivalent materials such as "cellophane," wax paper, and filter paper. The inner plate 15 and the "lining" bag 19 thereon are adapted to be detachably retained within the body member 10 by means of a series of indentations 21 struck inwardly from the flared peripheral wall 12.

The top wall 11 of the body member 10 is provided with a plurality of vent apertures 22, whereby air may have access to the molding chamber 17 through the diamond-shaped aperture 16 of the plate 15.

In order to allow the plate 15 to be readily removed from the cupped body member 10, the latter is provided with a knockout hole 23 located adjacent the edge of the top wall 11, whereby a thin round tool T (Figs. 4 and 5) may be passed through said hole to force the inner plate 15 and the bag 19 thereon outwardly so as to release them from the indentations 21 as shown in Fig. 5.

Operation

In operation, the food-molding press first will be manually applied to a substantially flat mass of the food to be molded, such as the ground meat L, located upon a flat support S, as shown in Fig. 7. The edge of the peripheral wall 12 will cut through the meat so as to confine a portion thereof within the molding chamber 17 in order to form a patty P. The press will now be slid along the support S by means of the handle 13, and the patty P will be transferred to a circular wax paper of the desired size which may be located on an adjacent surface (not shown). Or if desired, the patty P may be placed on the wax paper and molded directly thereon.

Figure 8:
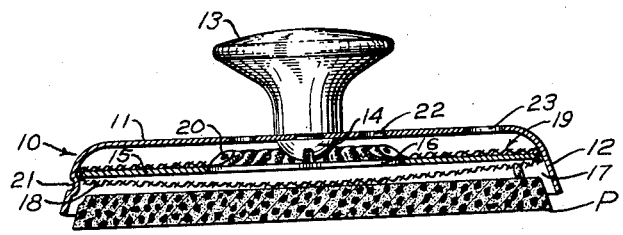
Fig. 8 is a cross-sectional view, showing the press as it appears when a patty is being released therefrom.

As illustrated in Fig. 8, it will be noted that the patty P will adhere to the lining 18 only enough to cause it to sag slightly, and the adhesion of the patty to the lining will easily be broken by the weight of the patty first at the edges and then progressively inward to the center thereof.

During this operation, air will pass freely to the interior of the chamber 17 of the press through the vent apertures 22, 23 and the diamond-shaped aperture 16 of the plate 15 so that any adhesion of the lining 18 to the outer surface of the inner plate 15 will instantly be broken.

It will be understood that the above-described operation may be repeated upon different portions of the mass L of meat to form additional patties.

When it is desired to clean the press, the inner plate 15 and the fabric bag 19 may easily be removed from the body 10 by inserting the point of a small tool T through the knockout aperture 23, against the inner plate 15 to disengage it from the nibs 21 and cause it to drop out of the body member 10. The bag 19 may then be removed from the inner plate 15 for washing or renewal.

It will be understood that the drawstring 20 may be manipulated to produce the desired tightness of the bag 19 about the plate 15. The latter will then be reinserted into the body member 10, as shown in Fig. 4.

One advantage of the improved food press herein disclosed is that the adhesion of the patties to the fabric lining is quite small so that when they are transferred to the place of deposit they may easily be shaken from the press.

Another advantage is that the press includes no moving stripper parts which heretofore have been considered necessary in order to secure positive ejection of the patties from food presses.

Another advantage is that the press may be easily taken apart and quickly and thoroughly cleaned.

Modified form

Figure 9:
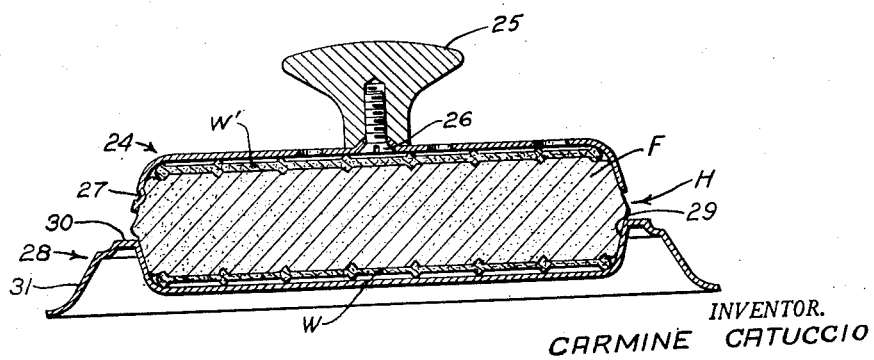
Fig. 9 is a cross-sectional view of a modified form of food-molding press which includes a recessed base, as it would appear when used for forming an ice cream sandwich.

The modified form of press shown in Fig. 9 includes a body member 24 and a central handle 25 which are similar to the body member 10 and the handle 13 shown in the first form of the invention.

In the modified form, however, the inner surface of the body member 24 is made flush by employing a flat-headed screw 26 for securing the handle 25 to the body member 24 and recessing the parts to accommodate the head of said screw.

This form of press may be used without an inner plate, but the body member 24 thereof is provided with inwardly struck projections or nibs 27 so that a plate such as the inner plate 15 of the first form of the invention may be secured in the body member if desired. Thus, the body member 24 may be used for molding food patties of different thicknesses, depending upon whether or not an inner plate is used.

In the forming of ice cream sandwiches, which commonly have a thickness ranging from three-quarters of an inch to one inch, the effective depth of the molding recess will be increased by employing a mold base 28 having a flat-bottomed lower molding chamber 29, which is complementary to the chamber of the body member 24.

The mold base 28 is preferably formed of sheet metal, and extends outwardly from the upper edge of the chamber 29 in the form of a narrow annular flat surface 30 and then downwardly as a flared supporting rim 31.

Operation of modified form

In use, the mold base 28 of the modified form of press will be supported upon a counter or other suitable level surface, and a biscuit or wafer W placed in the molding chamber 29. A quantity of ice cream C will then be placed upon the wafer W and an upper wafer W' placed thereon.

The body member 24 of the press will then be applied to the upper wafer W' and pressed downwardly in order to spread the ice cream into a sandwich filling layer F.

Thus, a complete ice cream sandwich H will be formed, after which the body member 24 may be removed, and the sandwich H lifted from the mold base 28.

One advantage of the modified form of the invention is that it is easily adjusted to efficiently mold food patties of different thicknesses.

Another advantage is that the level annular surface 30 surrounding the molding chamber of the base 28 will permit the molding device to operate efficiently, even though the body member 24 and the base 28 may be slightly out of alignment during the molding operation.

While there have been disclosed in this specification two forms in which the invention may be embodied, it is to be understood that these forms are shown for the purpose of illustration only, and that the invention is not to be limited to the specific disclosures, but may be modified and embodied in various other forms without departing from its spirit. In short, the invention includes all the modifications and embodiments coming within the scope of the following claim.

Having thus fully described the invention, what is claimed as new and for which it is desired to secure Letters Patent, is:

In a food molding device, an inverted cup-shaped body member having a flared peripheral side wall, a plate disposed within said body member in a plane substantially parallel with the top portion thereof, a flexible fabric lining embracing the underside of said plate and furnished with draw-string means above said plate for holding said lining in taut condition about said plate, said body member having a vertical handle concentrically secured to the top thereof, said handle being secured to said body member by a flat headed screw, the head of which engages the inner surface of said body member, the peripheral side wall of said body member being provided with a plurality of aligned inwardly-projecting detent portions cooperative with the peripheral edge portion of said plate to releasably retain said inner plate, together with its fabric lining, in said body member.

References Cited in the file of this patent

UNITED STATES PATENTS

| | | |
|---|---|---|
| 537,123 | Mills | Apr. 9, 1895 |
| 619,749 | Hooks | Feb. 21, 1899 |
| 627,429 | Lawbaugh | June 20, 1899 |
| 782,615 | Manning | Feb. 14, 1905 |
| 1,206,562 | McCarty | Nov. 28, 1916 |
| 1,535,871 | Stahley | Apr. 28, 1925 |
| 1,892,779 | Cole | Jan. 3, 1933 |
| 2,409,021 | Dale | Oct. 8, 1946 |
| 2,415,976 | Thorvd | Feb. 18, 1947 |
| 2,431,789 | Cosgrove | Dec. 2, 1947 |

FOREIGN PATENTS

| | | |
|---|---|---|
| 36,474 | Norway | Jan. 8, 1923 |
| 825,442 | France | Mar. 3, 1938 |